US012644331B2

(12) United States Patent
Pardal et al.

(10) Patent No.: US 12,644,331 B2
(45) Date of Patent: Jun. 2, 2026

(54) GLAZED UNIT COMPRISING A PROFILED BEAD WITH A FOAMING AGENT AND A BONDED COVER PIECE AS WELL AS THE METHOD FOR MANUFACTURING THE GLAZED UNIT

(71) Applicant: SAINT-GOBAIN GLASS FRANCE, Courbevoie (FR)

(72) Inventors: Xiaolin Pardal, Compiegne (FR); Fabienne Piroux, Compiegne (FR); Loïc Annequin, Jaux (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 226 days.

(21) Appl. No.: 18/555,442

(22) PCT Filed: Apr. 15, 2022

(86) PCT No.: PCT/FR2022/050718
§ 371 (c)(1),
(2) Date: Oct. 13, 2023

(87) PCT Pub. No.: WO2022/219291
PCT Pub. Date: Oct. 20, 2022

(65) Prior Publication Data

US 2024/0200396 A1 Jun. 20, 2024

(30) Foreign Application Priority Data

Apr. 16, 2021 (FR) ....................................... 2103984

(51) Int. Cl.
*E06B 3/56* (2006.01)
*E06B 3/54* (2006.01)

(52) U.S. Cl.
CPC .............. *E06B 3/56* (2013.01); *E06B 3/5409* (2013.01)

(58) Field of Classification Search
CPC . E06B 3/56; E06B 3/5409; B60J 10/15; B60J 10/34; B60J 10/5409; B60J 10/70
See application file for complete search history.

(56) References Cited

U.S. PATENT DOCUMENTS 4,894,972 A * 1/1990 Endoh ...................... B60J 10/30 296/84.1
6,257,644 B1 * 7/2001 Young ...................... B60J 10/70 296/93

(Continued)

FOREIGN PATENT DOCUMENTS

DE 18 02 853 A1 5/1970
DE 10300561 A1 * 7/2004 ............ B60R 13/04

(Continued)

OTHER PUBLICATIONS

International Search Report as issued in International Patent Application No. PCT/FR2022/050718, dated Jul. 12, 2022.

*Primary Examiner* — Christine T Cajilig
(74) *Attorney, Agent, or Firm* — CUSHMAN PARTNERS, LLC

(57) ABSTRACT

A glazed unit includes a glazed element, and including a profiled bead having a base which has a thickness of at least 5 mm, the base of the profiled bead including a material incorporating a foaming agent, wherein the glazed unit includes a cover piece including a cover baseplate extending substantially parallel to the base and further toward the exterior than the base, the cover piece adhering to the profiled bead using an adhesive layer sandwiched between a face of the cover baseplate and a face of the base.

19 Claims, 1 Drawing Sheet

(56) References Cited

U.S. PATENT DOCUMENTS

Figure 1:
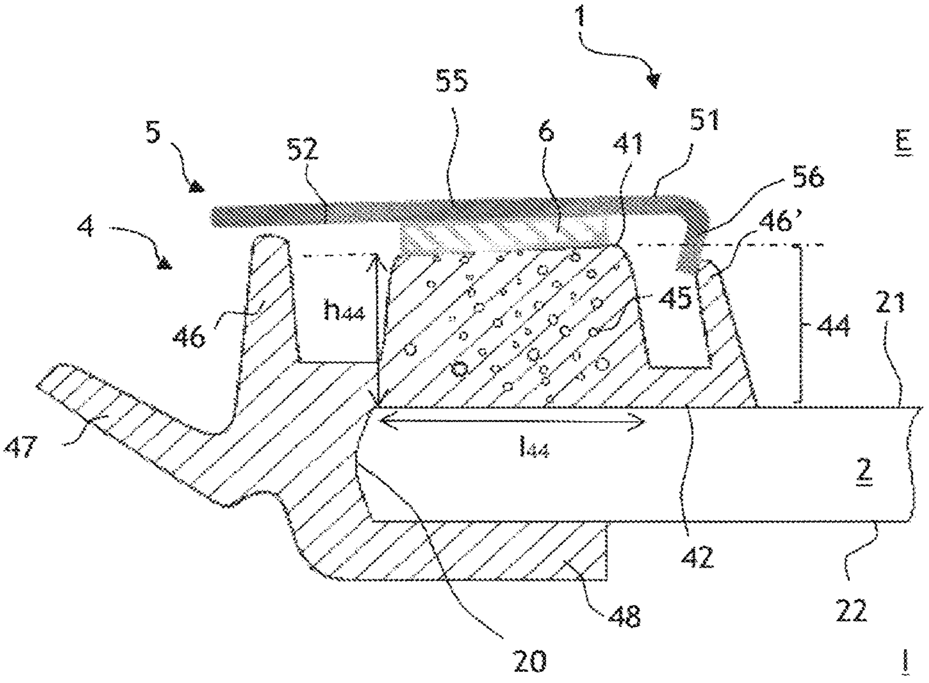

| | | | | |
|---|---|---|---|---|
| 2009/0169821 | A1* | 7/2009 | Takeuchi | B60J 10/17<br>428/156 |
| 2017/0291480 | A1* | 10/2017 | Kameoka | B60J 10/76 |
| 2019/0061208 | A1* | 2/2019 | Bocking | B60J 10/70 |

FOREIGN PATENT DOCUMENTS

| | | | | |
|---|---|---|---|---|
| EP | 0490092 | A2 * | 6/1992 | B60J 10/34 |
| WO | WO 2014/086303 | A1 | 6/2014 | |
| WO | WO 2015/074579 | A1 | 5/2015 | |

* cited by examiner

GLAZED UNIT COMPRISING A PROFILED BEAD WITH A FOAMING AGENT AND A BONDED COVER PIECE AS WELL AS THE METHOD FOR MANUFACTURING THE GLAZED UNIT

CROSS-REFERENCE TO RELATED APPLICATIONS

This application is the U.S. National Stage of PCT/FR2022/050718, filed Apr. 15, 2022, which in turn claims priority to French patent application number 2103984 filed Apr. 16, 2021. The content of these applications are incorporated herein by reference in their entireties.

The present invention relates to a glazed unit, and in particular a vehicle glazed unit, comprising a glazed element, producing a separation between an exterior space and an interior space, and comprising a profiled bead having, seen in cross-section, a base which is situated in contact with one face of said glazed element.

It is known that the base of the profiled bead may have a relatively high thickness, of at least 5 mm, considered from the face of the glazed element to which the profiled bead is attached.

However, such a thickness is difficult to implement by molding techniques. A first solution consists of providing an insert, generally made of plastic material, inside the base so that it occupies part of the volume of the profiled bead, but this is a complex and expensive technique because it can generate a large number of non-compliant glazed units. A second solution consists of producing the material of the base so that it incorporates a foaming agent.

International patent applications WO 2014/086303 and WO 2015/074579 disclose embodiments of a profiled bead incorporating a foaming agent.

Furthermore, it is known that a glazed unit may include a cover piece comprising a cover baseplate extending substantially parallel to said base and farther toward the outside than said base, but the mechanical attachment or chemical attachment of this cover piece to a thick base, of a thickness of at least 5 mm, is difficult to implement and to industrially control.

The purpose of the present invention is thus to remedy the disadvantages of the prior art by proposing a simple and effective solution for a glazed unit with a profiled bead and a thick base to be able to include a cover piece further toward the outside than this thick base.

Indeed, the inventors have discovered that, surprisingly, even if the density of a base whose material incorporates a foaming agent is lower, it was possible to effectively bond a cover piece to this thick base, even though the presence of the foaming agent is likely to affect or does affect the normally smooth surface of the base.

The fastening of the cover piece is thus extremely simple, while being very reliable and very compact.

The present invention relates, in its broadest sense, to a glazed unit according to claim 1. This glazed unit comprises a glazed element producing a separation between an exterior space and an interior space, and including a profiled bead having, seen in cross-section, a base which is located in contact with a face of said glazed element and which has a thickness of at least 5 mm from this face, said base of the profiled bead comprising a material incorporating a foaming agent, and this glazed unit is remarkable in that it includes a cover piece including a cover baseplate extending substantially parallel to said base and farther toward the exterior than said base, said cover piece adhering to said profiled bead using an adhesive layer sandwiched between a face of said cover baseplate and a face of said base.

Preferably, said profiled bead is based on, or is made of, TPE.

Preferably, said cover piece adheres to said profiled bead only using an adhesive layer; there is no mechanical attachment of said cover piece to said profiled bead.

Preferably, said base of the profiled bead is based on, or is made of, TPE.

Preferably, said base of the profiled bead does not include a filler or reinforcement piece; it only includes the material that constitutes it.

The thickness of said base may be 5.0 mm or more; it may be 5.0 mm to 15.0 mm; it may be at least 5.5 mm, or even at least 6.0 mm.

Preferably, said base has a density at least 5% lower, and preferably between 5% and 45%, or even between 10% and 35%; this low density is preferably measured relative to the density of another part of the profiled bead which is in the same material as said base; this other part is preferably without a foaming agent.

Preferably, said base of the profiled bead is located in contact with an exterior face of said glazed element, and more preferably only in contact with an exterior face of said glazed element.

Preferably, said base of the profiled bead is made of a material incorporating a foaming agent and preferably still the entire profiled bead is made of a material incorporating a foaming agent. Thus, a single material is used for the entire profiled bead, which is simpler but the foaming feature only occurs in the base, which has a thickness and therefore a volume, suitable for doing so; there are bubbles and a lower density only where the thickness is at least 5 mm.

Preferably, said glazed element is a fixed glazed element of a vehicle; it is not movable relative to the vehicle that carries it.

The present invention also relates to a method for manufacturing a glazed unit according to the invention, said glazed unit comprising a glazed element producing a separation between an exterior space and an interior space, and including a profiled bead having, seen in cross-section, a base which is located in contact with a face of said glazed element and which has a thickness of at least 5 mm from this face, a foaming agent being incorporated into said base of the profiled bead during the manufacture of said profiled bead by molding, said method being remarkable in that, after the manufacture of said profiled bead by molding, an adhesive layer is sandwiched between a face of said base and a face of a cover baseplate of a cover piece, said cover baseplate extending substantially parallel to said base and farther toward the outside than said base, in order to allow the adhesion of said cover piece to said profiled bead.

In order to manufacture the glazed unit according to the invention, there are therefore two successive operations.

Advantageously, the glazed unit according to the invention is particularly light since the base incorporating a foaming agent is lighter and the adhesive layer is also very light.

Advantageously, the cover piece is attached only by the adhesive layer; preferably, there is no other means of attachment between the cover piece and the rest of the glazed unit.

Figure 2:
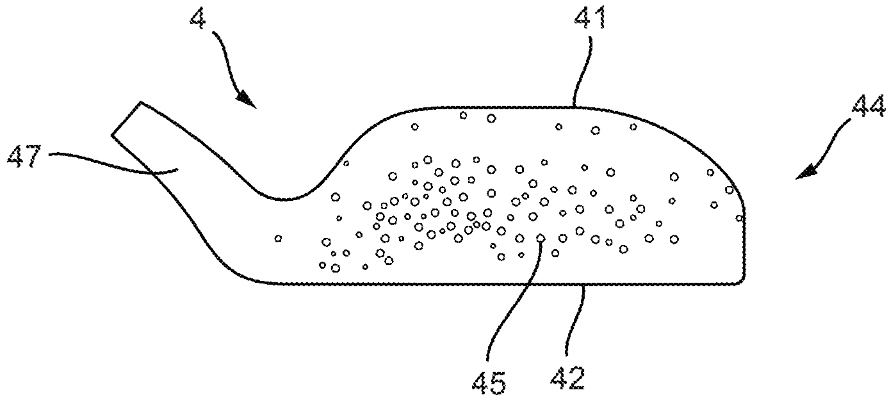

An embodiment of the present invention is described below by way of non-limiting example, with reference to the attached figures, in which:

FIG. 1 shows a partial cross-sectional view of a glazed unit according to the invention; and FIG. 2 is a photograph of a section of a base of a profiled bead with a foaming agent for the implementation of the invention.

In FIG. 1, the proportions between the various elements are retained, but the elements in the background are not shown, in order to facilitate the consultation of the figure.

The present invention relates to a glazed unit 1, and in particular a vehicle glazed unit as visible in FIG. 1. This glazed unit comprises a fixed glazed element 2, producing a separation between an exterior space E and an interior space I and includes a profiled joint portion (or bead) 4 made of a flexible polymer material which is situated along a lateral edge of the fixed glazed element, this joint portion extending further laterally than the lateral edge.

The seal portion includes a groove having in cross-section a U-shape which fits the edge of the glazed element 2.

The glazed unit 1 according to the invention which is shown in cross-section is a fixed rear side glazed unit of a motor vehicle body (not shown). It includes the glazed element 2, which is fixed relative to this body, and is provided with the profiled joint portion 4, made of a flexible polymer material, here along a lower horizontal edge of the glazed element 2; here, the profiled joint portion 4 is peripheral: it goes all the way around the edge of the glazed element 2.

The glazed unit 1 creates a separation between an interior space I of the vehicle and a space E outside the vehicle. The glazed element 2 thus has an exterior face 21 intended to face toward the exterior space E, an interior face 22 intended to face toward the interior space I, and a peripheral edge face 20, drawn as round here, but potentially being straight.

The glazed element 2 may be monolithic, as shown in FIG. 1, that is made up of a single sheet of material, or may be composite, that is made up of several sheets of material between which at least one layer of adhesive material is inserted in the case of laminated glazed units. The sheet(s) of material may be mineral, particularly made of glass, or organic, particularly made of plastic material.

When the glazed element is made of organic material, it is manufactured before the application of the invention, by molding the constituent material of the glazed element in a molding device including a mold having at least a fixed mold part and a movable mold part which is movable relative to the fixed mold part, said mold parts interacting in the closed state of the mold, during the molding stage, to form a mold cavity which in cross-section has the cross-sectional shape of the glazed element. Frequently, the glazed element of organic material is not flat, but curved.

When the glazed element is made of mineral material, it is manufactured before the application of the invention by melting mineral material into a flat sheet, and then cutting out this sheet and curving and/or dip-coating the sheet if required.

The profiled bead 4 thus has an exterior face 41 which is intended to face toward the exterior E of the vehicle, and an interior face 42 which is intended to face toward the interior I of the vehicle and in contact with the exterior face 21 of the glazed element 2.

The constituent polymer of the profiled bead 4 may be a thermoplastic (PVC, TPE, etc.), a polyurethane or even a synthetic rubber such as EPDM or any other suitable material.

The profiled bead 4 is preferably manufactured by implementing a manufacturing method known as "encapsulation" because it includes a step of molding the profiled bead 4 in a molding device, between two molding elements, one molding element accommodating the interior face of the glazed unit and one molding element accommodating the exterior face of the glazed unit, these two molding elements being closed on one another during the molding step while at the same time producing between them a molding cavity which is filled with the material of which the profiled bead 4 is made during the step of molding of this profiled bead.

The profiled bead 4 is preferably arranged around the entire periphery of the glazed element 2, although this profiled seal portion could very well be positioned on only part of the periphery of the glazed element 2.

Only the profiled bead 4 is manufactured on site, on the glazed element 2. All the other elements are prefabricated: manufactured before the manufacture of the profiled bead 4 on the glazed element 2.

The profiled bead 4 has a base 44 which is situated facing the exterior edge of the glazed element 2, two exterior wings 46, 46' which extend outwardly from the base 44 and opposite the glazed element 2 as well as a lip 47 which extends opposite the edge face 21 and opposite the glazed element 2.

The profiled bead 4 further includes an interior wing 48 which is situated facing the interior edge of the glazed element 2.

The profiled bead 4 fits the edge of the glazed element.

The base 44 has a height $h_{44}$ between 5.0 and 12.0 mm, or even between 5.0 and 10.0 mm; here, 6.0 mm.

The base 44 has a width $I_{44}$ between 5.0 and 150.0 mm and here for example 12.0 mm.

In order to make it possible to produce the profiled bead by injection molding ("encapsulation"), the base 44 of the profiled bead 4 includes a material 45 incorporating a foaming agent.

For greater simplicity, the entire profiled bead 4 was manufactured with the material 45 incorporating a foaming agent.

Two foaming agents were tested for the profiled bead made of TPE:

Hydrocerol BIH 20, at 0.8% by weight; and

Lubobatch PE BA 9537, at 0.8% by weight.

These two agents cause bubbles in the material of the base 44 having a diameter of the order of 50 to 2,000 microns, as can be seen in FIG. 2.

In both cases, the foaming agent has not modified the colorimetric appearance of the profiled bead on its surface.

However, in both cases, the exterior face 41 of the base 44 has a roughness whereas the rest of the profiled bead has a smooth exterior surface.

Furthermore, the glazed unit 1 includes a cover piece 5 including a cover baseplate 55 extending substantially parallel to the base 44 and farther toward the outside than the base 44 when the cover piece 5 is attached to the glazed unit 1.

The cover piece is thus an exterior trim part.

The cover baseplate 55 has an exterior face 51 oriented in the direction of said exterior space E and an interior face 52 oriented in the direction of the exterior face 21 of the glazed element 2.

The cover piece further has a wing 56, extending from said cover baseplate 55, at an angle of about 40°, towards the exterior face 21.

The material constituting the cover piece 5 is preferably a plastic material. It may for example be ABS or PMMA. It may also be metal or a metal alloy.

To attach the cover base 55 to the base 44, an adhesive layer 6 is positioned, in contact, between on the one hand the inner face 52 of the cover baseplate 55 and on the other hand, the exterior face 41 of the base 44.

The adhesive layer 6 is here adhesive tape here having a width of 10.0 mm and extending all along the cover base 55.

The tests were carried out with a black double-sided adhesive tape based on acrylic foam with product code GT6012 from the company 3M.

The cover piece 5 is preferably in a single piece to better protect the profiled bead 4. The adhesive tape is also preferably a single piece to be easier to apply.

Preferably, the cover base 55 is attached to the base in the following manner:

a adhesion primer is applied to the exterior face 41 of the base, then the adhesive tape is applied and bonded to the interior face 52 of the cover baseplate, then the cover piece is applied against the base so that the adhesive tape adheres to the exterior face 41 of the base.

This is only chemical fastening, by adhesion, without mechanical attachment.

The fastening of the cover piece to the base is surprisingly reliable.

Tests have shown that in both cases of foaming agent, it was necessary to exert a pulling force of more than 100 N to detach the cover part from the base.

The invention claimed is:

1. A glazed unit comprising:

a glazed element producing a separation between an exterior space and an interior space, and including a profiled bead having, seen in cross-section, a base which is located in contact with a face of said glazed element and which has a thickness of at least 5 mm from said face, said base of the profiled bead including a material incorporating a foaming agent, wherein the thickness of the base is higher than a thickness of a remainder of said profiled bead and the foaming agent forms bubbles in the base, including at an exterior surface thereof, such that the base is of a lower density than the remainder of said profiled bead, and a cover piece including a cover baseplate extending substantially parallel to said base and further toward an exterior than said base, an adhesive layer adhering said cover piece adhering to the exterior face of the base of said profiled bead, the adhesive layer being sandwiched between an interior face of said cover baseplate and the exterior face of said base.

2. The glazed unit according to claim 1, wherein said base of the profiled bead is based on, or is made of, thermoplastic elastomer (TPE).

3. The glazed unit according to claim 1, wherein said base of the profiled bead does not include a filler or reinforcement piece.

4. The glazed unit according to claim 1, wherein said base has a density at least 5% lower than a density of another part of the profiled bead.

5. A method for manufacturing a glazed unit according to claim 1, said glazed unit comprising a glazed element producing a separation between an exterior space and an interior space, and including a profiled bead having, seen in cross-section, a base which is located in contact with a face of said glazed element and which has a thickness of at least 5 mm from said face, a foaming agent being incorporated into said base of the profiled bead during manufacturing of said profiled bead by molding and wherein the thickness of the base is higher than a thickness of a remainder of said profiled bead and the foaming agent forms bubbles in the base, including at an exterior surface thereof, such that the base is of a lower density than the remainder of said profiled bead, the method comprising:

after the manufacturing of said profiled bead by molding, sandwiching an adhesive layer between the exterior face of said base and an interior face of said cover baseplate of a cover piece, said cover baseplate extending substantially parallel to said base and further toward the exterior than said base, in order to adhere said cover piece to said profiled bead.

6. The glazed unit according to claim 4, wherein said base has a density between 5% and 45% lower than the density of another part of the profiled bead.

7. The glazed unit according to claim 6, wherein said base has a density between 10% and 35% lower than the density of another part of the profiled bead.

8. The glazed unit of claim 1, wherein the bubbles in said base have a diameter between 50 to 2,000 microns.

9. The glazed unit of claim 1, wherein said cover piece is attached only by said adhesive layer with no other attachment therefor.

10. The glazed unit of claim 1, wherein at least 100 N in pulling force is required to pull and detach said cover piece from said base.

11. The glazed unit of claim 1, wherein said base has a density between 10% and 35% lower than the density of than the remainder of said profiled bead.

12. The glazed unit of claim 1, wherein the bubbles in said base have a diameter between 50 to 2,000 microns and said base has a density between 10% and 35% lower than the density of than the remainder of said profiled bead, and wherein said cover piece is attached only by said adhesive layer with no other attachment therefor and at least 100 N in pulling force is required to pull and detach said cover piece from said base.

13. A glazed unit comprising:

a glazed element producing a separation between an exterior space and an interior space, and including a profiled bead having, seen in cross-section, a base which is located in contact with a face of said glazed element and which has a thickness of at least 5 mm from said face, said base of the profiled bead including a material incorporating a foaming agent, wherein the thickness of the base is higher than a thickness of a remainder of said profiled bead and the foaming agent forms bubbles in the base such that the base is of a lower density than the remainder of said profiled bead, and a cover piece including a cover baseplate extending substantially parallel to said base and further toward an exterior than said base, an adhesive layer adhering said cover piece adhering to the exterior face of the base of said profiled bead, the adhesive layer being sandwiched between an interior face of said cover baseplate and the exterior face of said base;

wherein said base has a density between 10% and 35% lower than the density of than the remainder of said profiled bead, and wherein said cover piece is attached only by said adhesive layer with no other attachment therefor and at least 100 N in pulling force is required to pull and detach said cover piece from said base.

14. The glazed unit according to claim 13, wherein the bubbles in said base have a diameter between 50 to 2,000 microns.

15. A method for manufacturing a glazed unit according to claim 13, said glazed unit comprising a glazed element producing a separation between an exterior space and an interior space, and including a profiled bead having, seen in cross-section, a base which is located in contact with a face of said glazed element and which has a thickness of at least 5 mm from said face, a foaming agent being incorporated into said base of the profiled bead during manufacturing of said profiled bead by molding and wherein the thickness of the base is higher than a thickness of a remainder of said profiled bead and the foaming agent forms bubbles in the base such that the base is of a lower density than the remainder of said profiled bead, wherein said base has a density between 10% and 35% lower than the density of than the remainder of said profiled bead, the method comprising:

after the manufacturing of said profiled bead by molding, sandwiching an adhesive layer between the exterior face of said base and an interior face of said cover baseplate of a cover piece, said cover baseplate extending substantially parallel to said base and further toward the exterior than said base, in order to adhere said cover piece to said profiled bead, wherein said cover piece is attached only by said adhesive layer with no other attachment therefor and at least 100 N in pulling force is required to pull and detach said cover piece from said base.

16. The glazed unit according to claim 1, wherein the profiled bead comprises a pair of exterior wings on opposing sides of the base in spaced relation thereto, the wings extending outwardly away from the glazed unit.

17. The glazed unit according to claim 5, wherein the profiled bead comprises a pair of exterior wings on opposing sides of the base in spaced relation thereto, the wings extending outwardly away from the glazed unit.

18. The glazed unit according to claim 13, wherein the profiled bead comprises a pair of exterior wings on opposing sides of the base in spaced relation thereto, the wings extending outwardly away from the glazed unit.

19. The glazed unit according to claim 15, wherein the profiled bead comprises a pair of exterior wings on opposing sides of the base in spaced relation thereto, the wings extending outwardly away from the glazed unit.

* * * * *